United States Patent
Lalic et al.

(10) Patent No.: US 10,824,482 B1
(45) Date of Patent: Nov. 3, 2020

(54) REMOTE OPERATIONS APPLICATION PROGRAMMING INTERFACE

(71) Applicant: Microsoft Technology Licensing, LLC, Redmond, WA (US)

(72) Inventors: Marko Lalic, Seattle, WA (US); Brett Humphrey, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/419,263

(22) Filed: May 22, 2019

(51) Int. Cl.
*G06F 9/54* (2006.01)
*G06F 16/901* (2019.01)

(52) U.S. Cl.
CPC .............. *G06F 9/541* (2013.01); *G06F 9/547* (2013.01); *G06F 16/9024* (2019.01)

(58) Field of Classification Search
CPC .......... G06F 9/465; G06F 9/541; G06F 9/546; G06F 9/547
USPC .......................... 719/313, 314, 316, 328, 330
See application file for complete search history.

(56) References Cited

U.S. PATENT DOCUMENTS

| | | | | |
|---|---|---|---|---|
| 7,246,358 B2* | 7/2007 | Chinnici | ............ | G06F 9/547 719/313 |
| 7,584,176 B2* | 9/2009 | Chen | ............ | G06F 16/252 709/217 |
| 8,516,501 B2* | 8/2013 | Kalagananam | ..... | G06F 9/45504 717/166 |
| 9,009,110 B2* | 4/2015 | Brunswig | ............ | G06F 8/30 707/626 |
| 9,424,112 B1 | 8/2016 | Malamut et al. | | |
| 2005/0015780 A1 | 1/2005 | Mckeon et al. | | |
| 2005/0246326 A1 | 11/2005 | Mckeon | | |
| 2007/0124740 A1 | 5/2007 | Brunswig et al. | | |

OTHER PUBLICATIONS

"Fallacies of distributed computing", Retrieved from <<https://en.wikipedia.org/wiki/Fallacies_of_distributed_computing>>, Retrieved on Oct. 24, 2018, 2 Pages.
"UI Automation", Retrieved from <<https://docs.microsoft.com/en-us/windows/desktop/WinAuto/entry-uiauto-win32>>, May 31, 2018, 2 Pages.
"International Search Report and Written Opinion Issued in PCT Application No. PCT/US20/028564", dated Jun. 17, 2020, 11 Pages.

* cited by examiner

*Primary Examiner* — Andy Ho
(74) *Attorney, Agent, or Firm* — Holzer Patel Drennan (57) ABSTRACT

A remote applications application programming interface (API) system disclosed herein is implemented using various computer process instructions including accumulating one or more cross-process calls from a client process to a provider process into a remote operations object, evaluating the one or more cross-process calls from the client process to determine one or more conditional operations, generating a remote operations graph based on the conditional operations, wherein the graph including a plurality of remote operations graph nodes encoding logic of the one or more conditional operations, and communicating the remote operations graph in a single cross-process call across the process boundary to the provider process.

20 Claims, 6 Drawing Sheets

REMOTE OPERATIONS APPLICATION PROGRAMMING INTERFACE

BACKGROUND

Various application programming interfaces (APIs) rely on cross-process communication between a process requesting information and a remote process providing the information. For example, a user interface (UI) automation (UIA) API relies on cross-process communication between a UIA client requesting information from a remote UIA provider hosting the UI. In such an implementation, each UIA client may communicate on a peer-to-peer basis with each process that hosts UI. In such an implementation, there may be no central location that holds all the UI information for the entire system. As a result, effectively every individual method call incurs a cross-process call so that the information can be extracted from the process hosting the UI. In other words, for every piece of information that is requested, a cross-process call is made, resulting in a large amount of cross process communications.

SUMMARY

Implementations described herein disclose a remote operations application programming interface (API) system. An implementation of the remote operations API system is implemented using various computer process instructions including accumulating one or more cross-process calls from a client process to a provider process into a remote operations object, evaluating the one or more cross-process calls from the client process to determine one or more conditional operations, generating a remote operations graph based on the conditional operations, wherein the graph including a plurality of remote operations graph nodes encoding logic of the one or more conditional operations, and communicating the remote operations graph in a single cross-process call to the provider process.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

A further understanding of the nature and advantages of the present technology may be realized by reference to the figures, which are described in the remaining portion of the specification.

DETAILED DESCRIPTIONS

Various application programming interfaces (APIs) rely on cross-process communication between a process requesting information and a remote process providing the information. For example, a user interface (UI) automation (UIA) API relies on cross-process communication between a UIA client requesting information from a remote UIA provider hosting the UI. In such an implementation, each UIA client may communicate on a peer-to-peer basis with each process that hosts UI. In such an implementation, there may be no central location that holds all the UI information for the entire system. As a result, effectively every individual method call incurs a cross-process call so that the information can be extracted from the process hosting the UI. In other words, for every piece of information that is requested, a cross-process call is made, resulting in a large amount of cross process communications. In such implementation, the overhead of every cross-process call comes to dominate the time that the most important UI clients, such as screen readers, spend when using the UI APIs.

A remote operations application programming interface (API) system disclosed herein allows reducing the overhead of cross-process communication in a system where a single process may be attempting to extract information from a number of other remote processes. An example of such an API is Microsoft Windows™ UIAutomation. Implementations of the remote operations application programming interface (API) system disclosed herein allows remoting a collection of operations with embedded logic across a cross-process communication boundary or edge. For example, such processes may be local processes on a single machine or they may be processes on different machines where a transport protocol is established between these processes. Such transport protocol between the processes is also referred to as "pipes." In an alternative implementation, the processes may be on remote machines and the transport protocol is established between these processes may be a different protocol, such as an Internet protocol, such as transmission control protocol (TCP).

The technology disclosed herein solves a technical problem of managing the excessive time taken in processing cross-process calls between a client process and a provider process in a computing environment. The high volume of cross-process calls generated by computing processes it a technical problem resulting from existing computing architecture where each process call is processed by the provider process individually and the response from such individual process call is evaluated by the client process to generate the next process call to be communicated across an cross-process edge to the provider process. Such serial communication across process call boundary not only results in a large number of cross-process calls but may also result in a client process making a decision based on stale data received from the provider process. By incorporating the logic inherent in one or more process calls from the client process into a remote applications graph that may be used to make a single cross-process call, the technology disclosed herein solves the technical problems discussed above.

Figure 1:
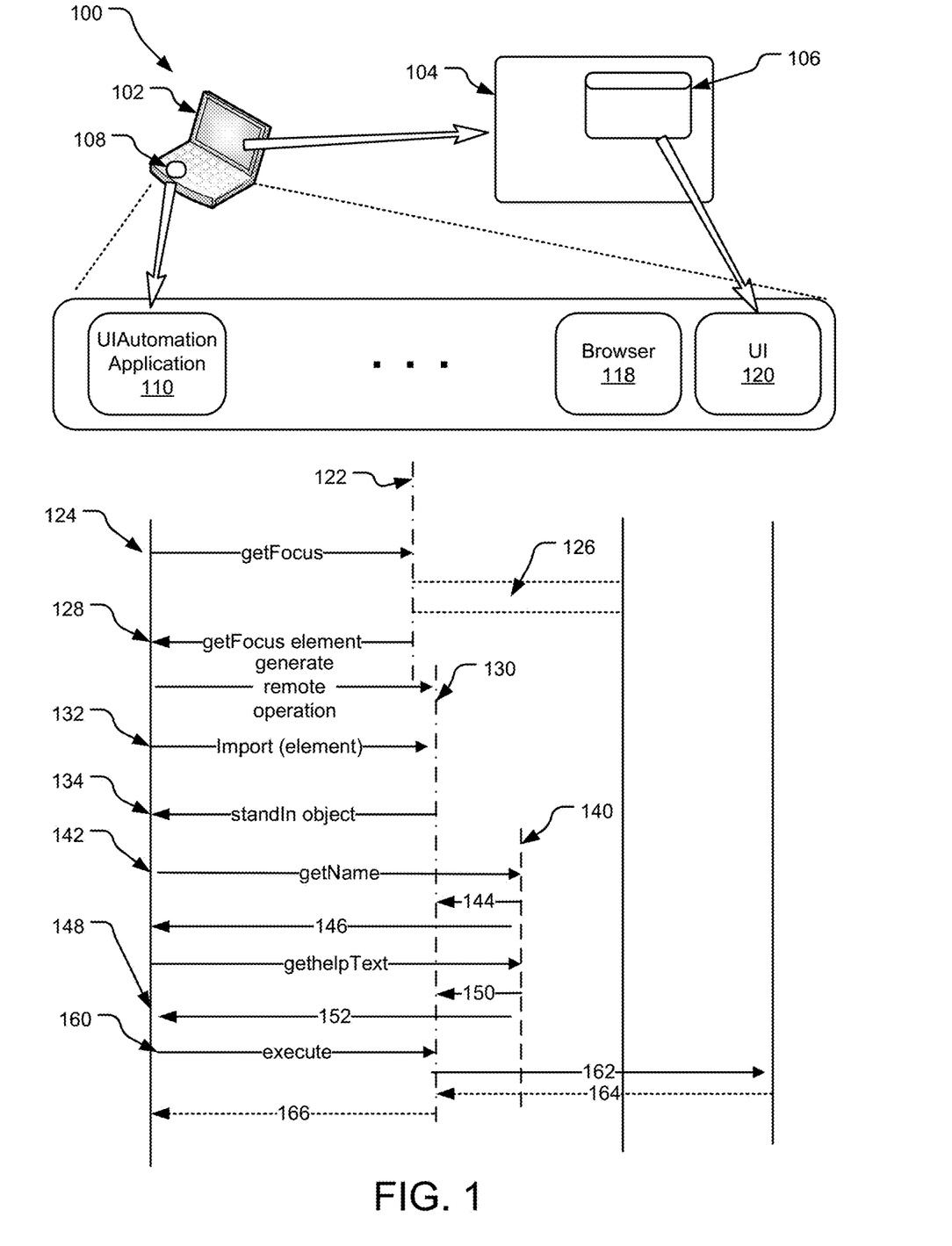
FIG. 1 illustrates an example of a remote operations application programming interface (API) system as disclosed herein.

FIG. 1 illustrates a remote operations application programming interface (API) system 100 as disclosed herein. The API system 100 may be implemented on a computing device 102 with a number of processes 108 stored in its memory and executable on a processor of the computing device 108. For example, such processes 108 may include a UIA application 110 for narrating a UI 106 that may be shown on a browser UI 104. In such an implementation, the browser UI 104 may be generated by a browser process 118.

Upon initiation of the UIA application 110 for narrating UI 120, it determines which process owns the UI 120. In the illustrated implementation, the UIA application 110 determines that the browser process 118 owns the UI 120. Subsequently, the UIA application 110 generates a UIA object 122 through an application programming interface (API). The UIA object 122 can communicate with the process that owns the UI 120, in this case the browser process 118. In one implementation, the UIA application 110 initiates a getFocus request 124 to communicate between the UIA application 110 and the UIA object 122. The getFocus request 124 initiates a connection (also referred to as the pipe) 126 between the browser process 118 and the UIA object 122 and returns a getFocus element representation 128 to the UIA application 110. The getFocus element representation 128 includes process ID of the process that it belongs to, a named pipe handle for the connection 126, and an identifier of an element ID in the process that it belongs to, in this case the UI 120. Using the connection 126, the UIA object 122 can discover the tree of the UI 120 owned by the browser 118. For example, such tree may be as disclosed below:
  desktopRoot
    browserToplevelWindow
      browserTitlebar
        titlebarName
        titlebarMinimize
        titlebarMaximize
        titlebarClose
      browserContent
        contentButton1
        ...

In such a case, the UIA object 122 may request information about components of the UIA tree using cross-process calls via the connection 126.

Once the UIA object 122 and returns a getFocus element representation 128 to the UIA application 110, an implementation of the remote operations API system 100 generates a remote operation object 130. Specifically, the remote operation object 130 acts as an entry point to the API system 100 in that is allows creation of the stand-in object 134 for existing client objects, such as client objects from the UIA application 110. Specifically, the stand-in object 134 mirrors the API of these client objects. Furthermore, the remote operation object 130 may also add operations to a graph (further discussed below in FIGS. 4 and 5), where such operations may not be directly related to a call in the stand-in object 134. An example of such operations may include conditional operations or loop operations. In an alternative implementation, the stand-in object 134 may be configured to add one or more of its operations to such graphs. Furthermore, the remote operation object 130 may also add operations to the graph in response to calls made on the remote operation object 130 by the client objects. Similarly, in response to calls made on the stand-in object 134 by the client objects, the stand-in object 134 internally calls into the remote operation object 130 that the stand-in object 134 is tied to, resulting in an operation to be added to a graph owned by that remote operation object 130.

The remote operation object 130 accumulates a graph of a number of operations from the UIA application 110. Subsequently, at 132, the UIA application 110 initiates an import element request to the remote operation object 130.

In response, the remote operation object 130 returns a stand-in object 134, also referred to as a RemoteElement. The stand-in object 134 represents a remote element 140. The stand-in object 134 may be an abstract representation of an actual UIA element that will be generated when the remote operation is evaluated on the provider side.

An implementation of the stand-in object 134 may contain an ID of the remote element 140 that is represents to and a reference to the remote operation that the remote element 140 is part of. The reference to the remote operation allows the stand-in object 134 to determine which graph to add new instructions to. The ID of the remote element 140 allows the stand-in object 134 to identify the actual object when the remote operation is evaluated.

In the illustrated implementation, the UIA application 110 initiates a getName call at 142 on the remote element 140. In response, at 144 the remote element 140 adds an operation addgetName to the remote operation object 130. The addgetName operation is added to the graph of operations in the remote operation object 130. Specifically, the remote element 140 does not generate any cross-process call to the browser process 118. Subsequently, at 146 the control is transferred back to the UIA application 110.

At 148 the UIA application 110 may generate a gethelpText call to the remote element 140. In response, at 150, the remote element 140 adds a gethelpText operation to the remote operation object 130. Again, at 152, the control is transferred back to the UIA application 110. The UI application 110 may generate a number of additional function calls to the remote element 140 and in response these operations may be added to the graph of remote operation object 130.

Once all function calls to the remote element 140 are complete, at 160 the UIA application 110 generates a remote operation execute call to the remote operation object 130. In response, the remote operation object 130 generates a cross-process call 162 to the UI process 120. The cross-process call 162 includes all operations in the graph of operations in the remote operation object 130. In response, at 164 the UI process 120 decodes the graph of operations, assembles a return object that includes the results of each of the operations to the remote operation object 130, and returns the return object to the remote operation object 130. Subsequently, at 166 the remote operation object 130 returns these results to the UIA application 110.

As a result of accumulating a large number of the process calls in the remote operation object 130, the number of cross-process calls between the UIA application 110 and the UI 120 are reduced. Instead, one cross-process call is made with the graph of the operations accumulated in the remote operation object 130. This significantly reduces the amount of utilization of the connection 126 between the cross-border processes such as the UIA application 110 and the UI 120. In other words, the chattiness resulting from the cross-process calls is significantly reduced. Furthermore, using the remote operation object 130 also helps address race condition resulting from change in data at a target process, such as UI 120 as UI 120 generates all results to the graph of operations substantially simultaneously.

In one implementation, the remote object 130 accumulates a graph of operations that includes a logic behind various process calls generated from an originating process such as UIA application 110. For example, the UI 106 may include two lines of text as outlined below:
  Hello world foo
  bar baz As outlined above, the text on the UI 106 includes three words on the first line and two words on the second line. As the UIA application 110 does not know the number of words and lines on the UI 106, it may first issue one or more Move calls until such calls return zero (o) indicating that there are no more words in the text. After each Move call that returns a non-zero result, the UIA application 110 generates a getText call in order to get the text of the word where the control is moved to. For the UIA application 110, to get these two sentences from the UI 106 without using the remote operation object 130, it may require as many ten to eleven cross-process calls to the UI process 120, resulting in several ms worth of delay. Furthermore, a simple batching of requests from the UIA application 110 to the UI process 120 may not be sufficient because the result of each of the series of process calls to the UI process 120 needs to be evaluated by the UIA application 110 before it generates the next cross-process call for the next word.

An implementation of the remote operations API system 100 disclosed herein, builds the graph of computation underlying the logic based on which the cross-process calls are generated between the UIA application 110 and the UI process 120 in the remote operation object 130 and generates a cross-process call to the UI process 120 using the graph.

Figure 2:
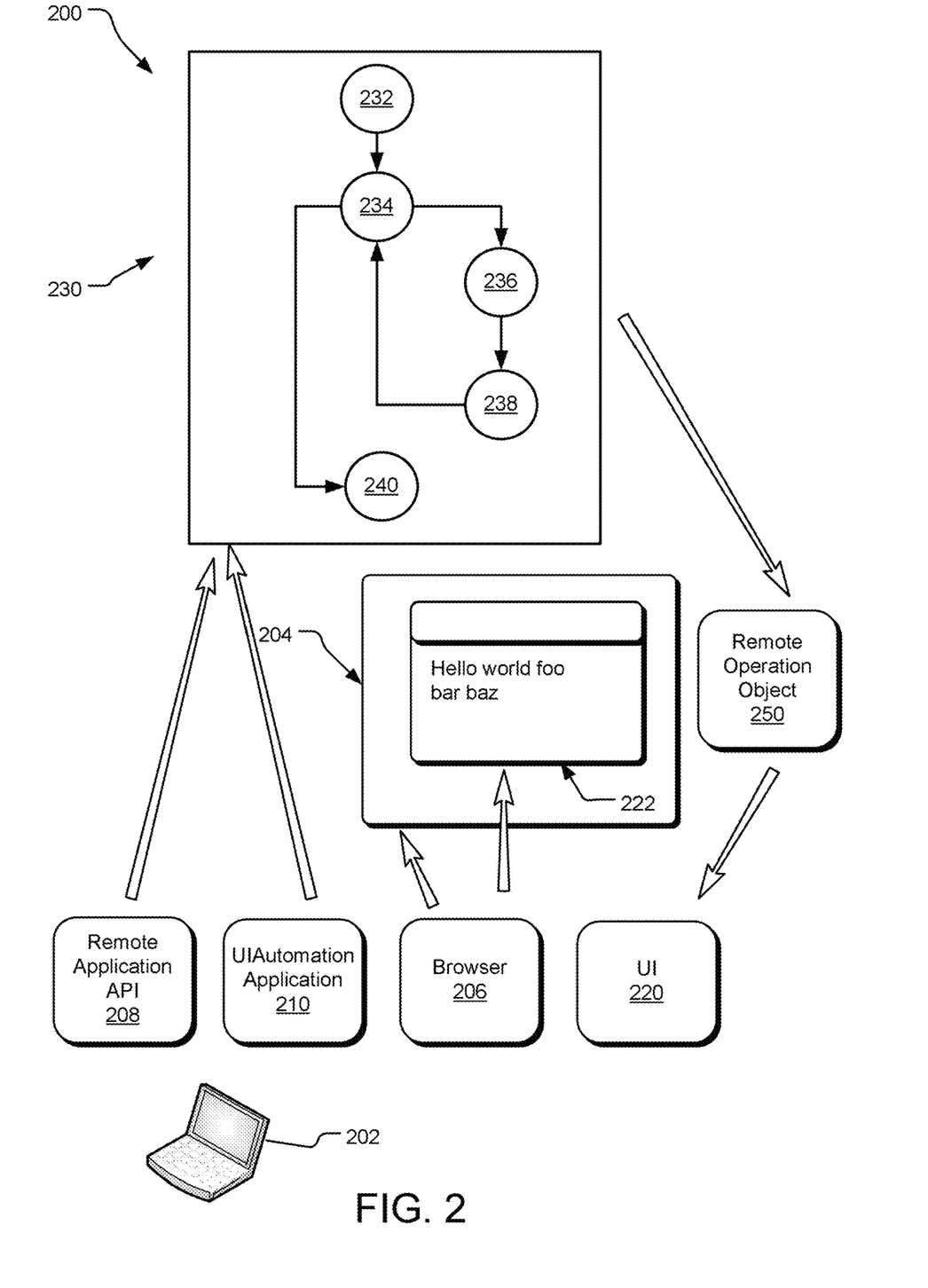
FIG. 2 illustrates another example implementation of a remote operations application programming interface (API) system as disclosed herein.

FIG. 2 illustrates another example implementation of a remote operations application programming interface (API) system 200 as disclosed herein. Specifically, FIG. 2 illustrates a computing device 202 with a UTA application 210 for building a graph 230 to read a UI 222 that is generated by a UI process 220. The UI 222 may be displayed in a browser 204 that is rendered by a browser process 206. Specifically, the UI 222 may display a sentence as below:

Hello world foo
bar baz

In such an implementation, the graph 230 may include a move process node 232 for a move command that returns the count of words that the move process node 232 successfully moves. For example, if the move process node moves zero (0), it means that the move process did not move any further and therefore there are no more remaining words. The output of the process node 232 may be input to an evaluation process node 234 that evaluates the result of the move process node 232. For example, the evaluation process node 234 may evaluate the condition that a count of the remaining words in the UI 222 is zero. Depending on the outcome of the evaluation process node 234, the control may be transferred to one of a getText process node 236 or a terminate operation evaluation node 240. Specifically, if the evaluation process node 234 determines that the count of the remaining words in the UI 222 is zero, control is transferred to the terminate operation evaluation node 240. However, if the evaluation process node 234 determines that the count of the remaining words in the UI 222 is not zero, the getText process node 236 makes a getText process call. Subsequently, a move process node 238 initiates a move process call to move the read text. Once the read text is moved, the control is transferred back to the evaluation process node 234 to reevaluate the condition as to whether the count of the remaining words in the UI 222 is zero.

The graph 230 is an abstract representation of the process calls that are transferred via a remote operation object to the UI process 220. Specifically, a remote applications API 250 evaluates the process nodes 232-240 of the graph 230, generates a remote operation object encoding the conditional graph into a series of operations. In the given example graph 230, the code for the series of operations in the remote operation object 250 may be shown as below:

```
RemoteOperation op;
RemoteRange r = op.Import(range);
RemoteInt c = r.Move (word, 1);
RemoteBool cond = c! = 0;
RemoteList list = op.Createlist( );
Op.Loop (cond, [&]( );
    Remote String str = r.GetText( )
    List.Add (str)
    Auto c = r.Move (word, 1)
    Cond. Set (C != 0);
};
Token token = list.MakeResult( )
Results result = op.Execute
Vectorstring w = results.Get(token)
```

Here process calls on the object r are not cross-process calls. For example, the Move call on the object r returns another stand-in object RemoteInt c. Subsequently, a stand-in object RemoteBool is created for the count not being zero and a stand-in object RemoteList is created for storing the list generated by a createList operation. Once the remote operation object 250 is communicated to the UI 220, the operations of the remote operation object 250 are executed and the resulting vector string that contains the list of words "Hello world foo bar baz" is communicated back to the UIA application 210. The components of the graph 230 are disclosed in further detail below in FIG. 5.

Figure 3:
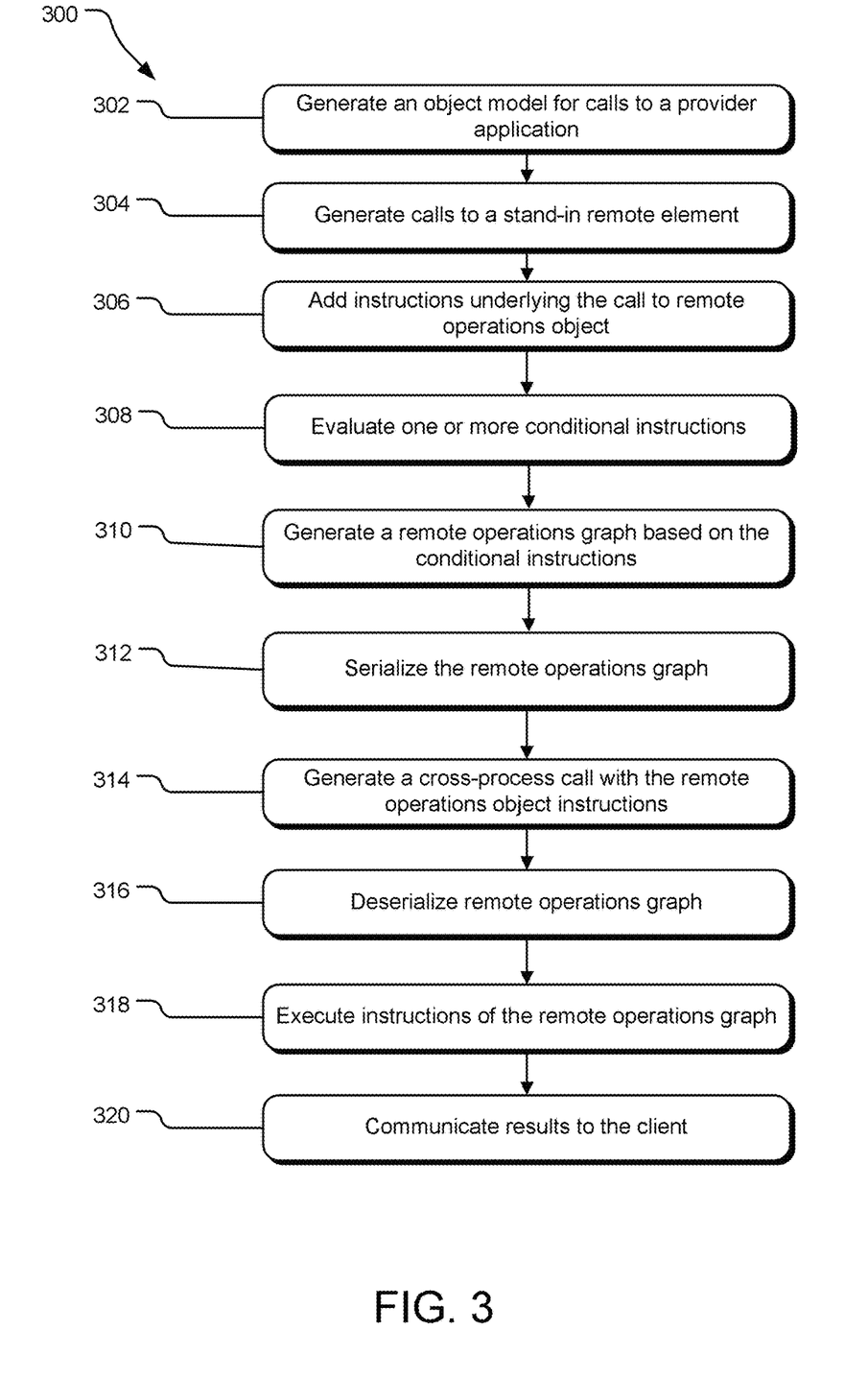
FIG. 3 illustrates example operations for providing an application programming interface for remote operations in a manner disclosed herein.

FIG. 3 illustrates example operations 300 for providing an application programming interface for remote operations in a manner disclosed herein. At operation 302 a client application, such as a UIA client application generates an object model with a set of instructions for cross-process calls to a provider application. For example, the client application may be a UIA client application and the provider application may be a UI application. At operation 304 the remote operations API system generates calls to a stand-in object, such as the remote element 140 illustrated in FIG. 1. At 306 the stand-in object adds the instruction underlying the to a remote operation object. Once all calls from the client object are complete, at 308, the remote operations API system evaluates the instruction underlying the calls and determines one or more logical or conditional operations of the client object model. For example, such logical or conditional operations may be an if operation, a loop operation, etc.

At 310, the remote operations API system generates a remote operations graph encoding the logic of the multiple calls from the client object model, for example, if a call generated by the client object model is a conditional operation involving evaluating an operation, the remote operations API system generates a instructions representing a fork node and one or more subgraph nodes, where each of the subgraph nodes may include one or more instruction nodes that are to be executed at a group. In the illustrated implementation, the remote operations graph does not include any pointers in its internal representation. This allows the remote operations graph to be serialized and de-serialized. Furthermore, the remote operations graph includes a flat vector that owns all nodes of the remote operations graph.

Each of the remote operations graph nodes have an identification (ID) attached thereto where the ID corresponds to the node's index in the vector. In one implementation, the addition of a node to the remote operations graph is irreversible in that once a node is added, it cannot be removed from the graph. Furthermore, the edges connecting the graphs are represented by the neighboring nodes' IDs.

Each node has its own structure representing it, with the vector holding a variant of the possible structures. This, in addition to not using pointers and avoiding additional allocations when creating the remote operations graph, allows for an efficient deserialization. As a result, the remote operations API is able to allocate a buffer large enough to hold the entire deserialized remote operations graph simply by knowing the number of nodes in the remote operations graph.

At operation 312, the remote operations API system serializes the remote operations graph. Specifically, at this operation, a flat vector representing all the nodes is serialized. In one implementation, the serializing operation includes writing the instructions of the remote operations graph into a buffer. As a result, the serialization operation results in generation of a flat byte buffer representing the operations of the remote operations graph.

Subsequently, an operation 314 makes a single cross-process call using the remote operations graph. The remote operations graph is deserialized by the provider process at operation 314. At 316, the provider process, such as a UI process executes various instructions of the remote operations graph and the results are communicated to the client at an operation 318.

Figure 4:
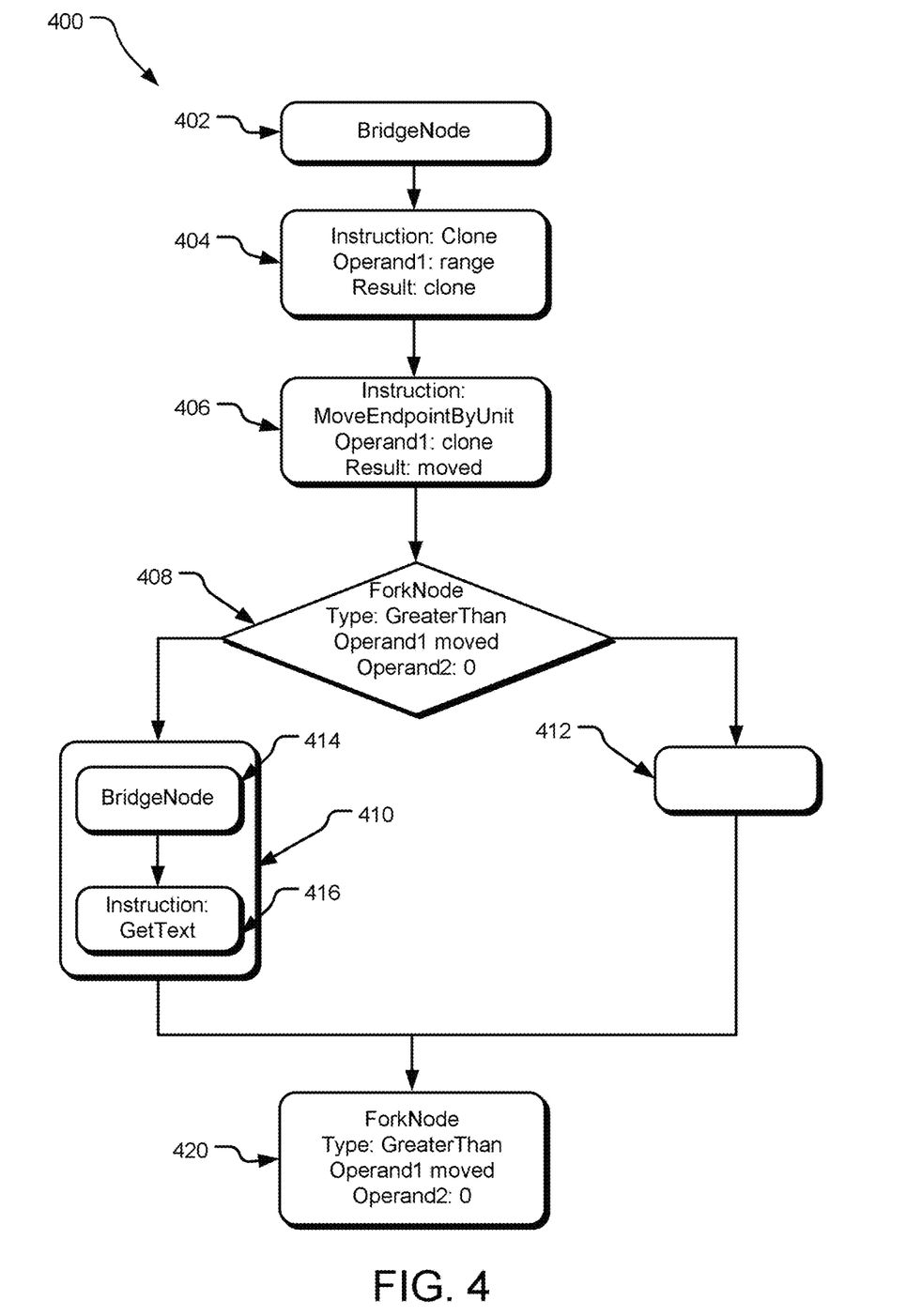
FIG. 4 illustrates alternative example operations for providing an application programming interface for remote operations in a manner disclosed herein.

FIG. 4 illustrates alternative example remote operation graph 400 for providing an application programming interface for remote operations in a manner disclosed herein. The remote operation graph 400 may be an abstract representation of remote operations involving a simple conditional code segment generated by a client as shown below:

```
OperationBuilder operation;
ResultToken<std::wstring> resultToken;
auto range = operation.ImportRange(originalRange);
RemoteRange clone = range.Clone( );
RemoteInt moved = clone.MoveEndpointByUnit(
TextPatternRangeEndpoint_Start, TextUnit_Word, 1);
operation. If(
    operation.NewGreaterThanCondition(moved, 0),
    [&]( )
    {
       // True
       RemoteString text = clone.GetText( );
       resultToken = text.MakeResult( );
    },
    [&]( )
    {
       // False . . . Nothing to do in this case.
    }
);
OperationResults results = operation.Execute( );
std::optional<std::wstring> rangeText =
results.GetResult(resultToken);
```

Specifically, the remote operation graph 400 exposes an interface that lets the remote operations API system disclosed herein build and traverse the graph. Herein the edges of the graph represent control flow. The remote operation graph 400 illustrates two types of nodes, specifically, instruction nodes 404, 406, and 416 are nodes that contain a single instruction that should be executed. After the instruction is executed, control flow continues to the next node in the graph. On the other hand, a fork node, such as the fork node 408 contains an instruction that, when evaluated results in selection of one of multiple possible control flow paths. A subgraph node, such as the nodes 410 and 412 are nodes that themselves may contain a full RemoteOperationGraph. These nodes represent a block of instructions that should be executed as a unit. For example, the instructions 414 and 416 of the subgraphnode 410 are to be executed as a block. Finally, a bridge node, such as the bridge nodes 402 and 414 serve as bridges between fork nodes and the nodes that follow.

Specifically, the bridge node 402 is a root node. The instruction node 404 [RemoteRange clone=range.Clone( )] clones with an operand of range and result that is stored in clone, which may be represented by a number when the operation graph is built by the client using remote operations. Furthermore, clone is a stand-in for RemoteRange on the client side, whereas it may be a UI automation text range when the operation is executed on the provider side. Subsequently, the instruction node 406 [RemoteInt moved=clone.MoveEndpointByUnit] moves the end point by a unit, where its operand is encoded by a number that is the result of the instruction node 404. The result of the instruction node 406 is the number of units that are moved. Subsequently, the fork node 408 [If(operation.NewGreaterThanCondition(moved, 0), [&]( )] evaluates a condition and the instruction node 416 represents [RemoteString text=clone.GetText( ); resultToken=text.MakeResult( )] if the condition is true.

Figure 5:
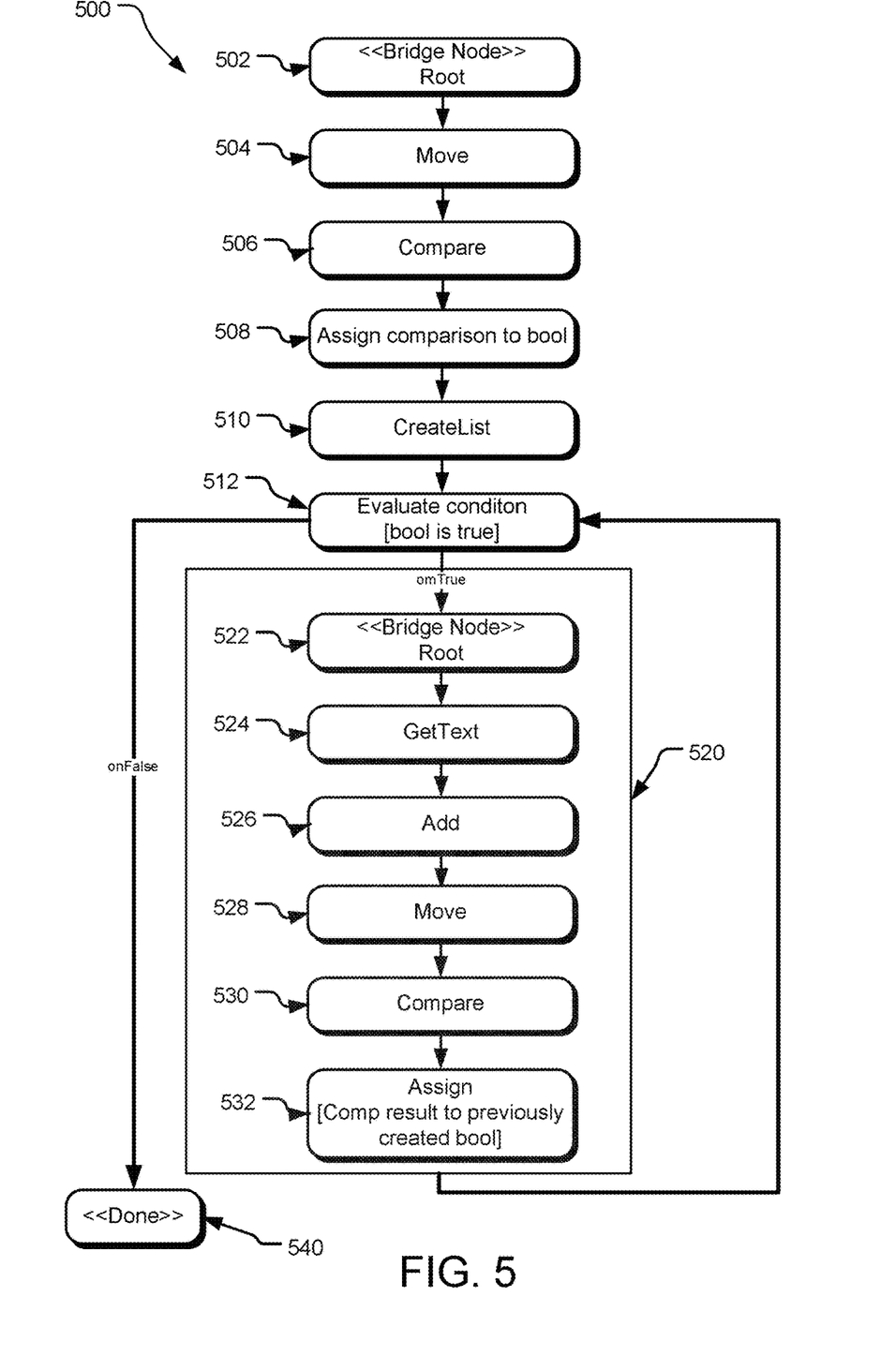
FIG. 5 illustrates example components of a graph generated to read a user interface that is generated by a UI process.

FIG. 5 illustrates components of a graph 500 generated to read a user interface that is generated by a UI process. Specifically, 502 represents a root bridge node of the graph 230 (illustrated in FIG. 2). The operation r.Move (word, 1) may be represented by a process node 504. Process nodes 506 and 508 represent the comparison operation cond=c!=0 and its assigning to Remotebool. The process node 510 may represent the op.CreateList( ) operation.

The condition node 512 is generated because of the operation op.loop, the operand for this node, i.e., which bool to use to evaluate it, is decided based on the first parameter [any remote bool stand-in that is passed in to that node]. A subgraph 520 is generated starting with another root bridge node 522. Process node 524 represents r.GetText( ) operation. Process node 526 represents List.Add(str) operation. Process node 528 represents r.Move operation and the process node 530 represents the comparison operation where the condition C !=0 is evaluated. At process node 532, the result of the comparison is assigned to previously a created Boolean. If the condition is evaluated to be false at comparison node 512, at node 540, the graph terminates.

Figure 6:
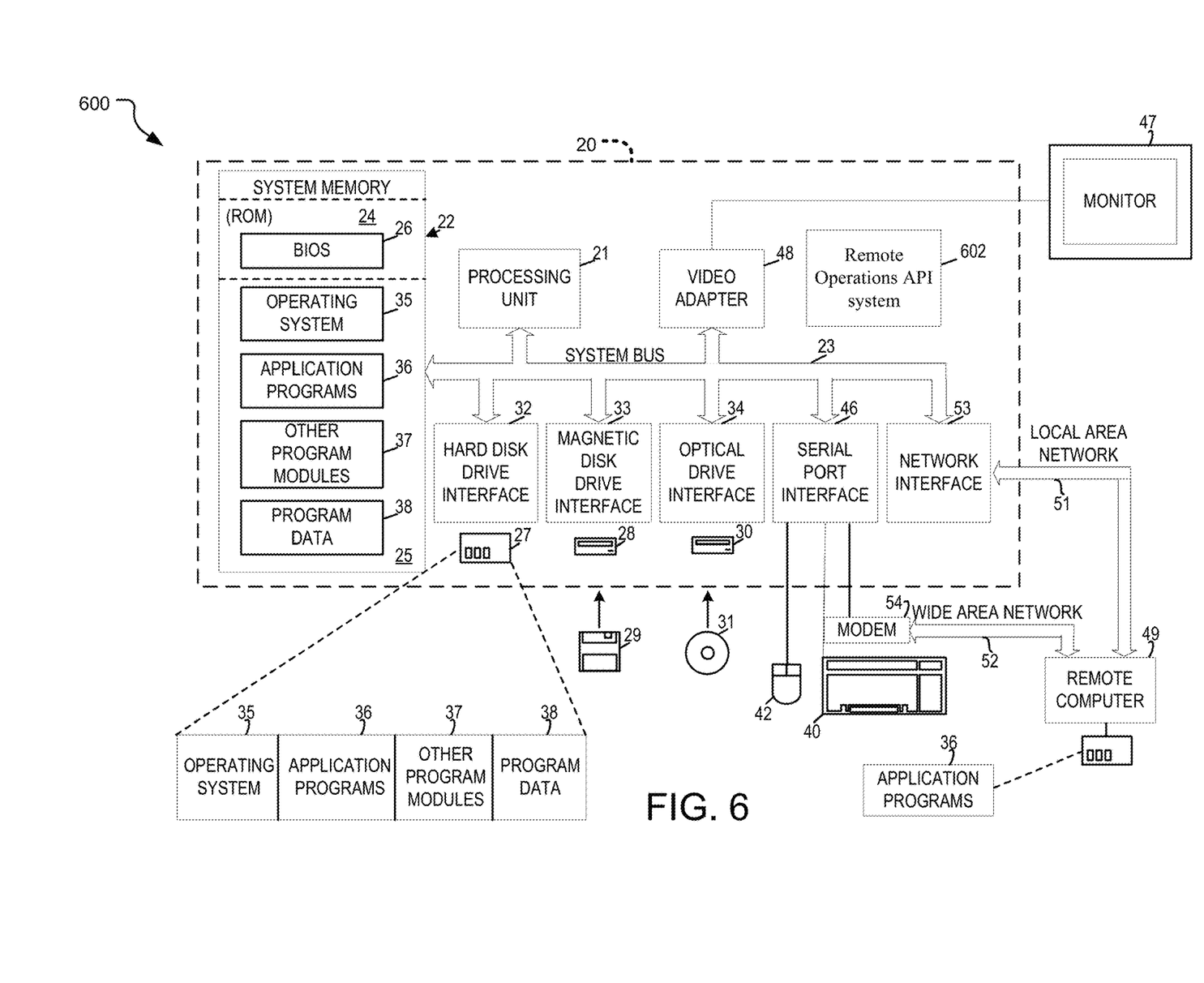
FIG. 6 illustrates an example computing system that may be useful in implementing the described technology.

FIG. 6 illustrates an example system 500 that may be useful in implementing the described technology for providing remote operations API. The example hardware and operating environment of FIG. 6 for implementing the described technology includes a computing device, such as a general-purpose computing device in the form of a computer 20, a mobile telephone, a personal data assistant (PDA), a tablet, smart watch, gaming remote, or other type of computing device. In the implementation of FIG. 6, for example, the computer 20 includes a processing unit 21, a system memory 22, and a system bus 23 that operatively couples various system components including the system memory to the processing unit 21. There may be only one or there may be more than one processing unit 21, such that the processor of the computer 20 comprises a single central-processing unit (CPU), or a plurality of processing units, commonly referred to as a parallel processing environment. The computer 20 may be a conventional computer, a distributed computer, or any other type of computer; the implementations are not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide non-volatile storage of computer-readable instructions, data structures, program modules and other data for the computer 20. It should be appreciated by those skilled in the art that any type of tangible computer-readable media may be used in the example operating environment.

A number of program modules may be stored on the hard disk drive 27, magnetic disk 28, optical disk 30, ROM 24, or RAM 25, including an operating system 35, one or more application programs 36, other program modules 37, and program data 38. A user may generate reminders on the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus 23, but may be connected by other interfaces, such as a parallel port, game port, or a universal serial bus (USB) (not shown). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device or other common network node, and typically includes many or all of the elements described above relative to the computer 20. The logical connections depicted in FIG. 10 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are examples and other means of communications devices for establishing a communications link between the computers may be used.

In an example implementation, software or firmware instructions for providing remote operations API may be stored in memory 22 and/or storage devices 29 or 31 and processed by the processing unit 21. One or more datastores disclosed herein may be stored in memory 22 and/or storage devices 29 or 31 as persistent datastores. For example, a remote operations API system 602 may be implemented on the computer 20 (alternatively, the remote operations API system 602 may be implemented on a server or in a cloud environment). The remote operations API system 602 may utilize one of more of the processing unit 21, the memory 22, the system bus 23, and other components of the personal computer 20.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

An implementation disclosed herein includes a physical article of manufacture including one or more tangible computer-readable storage media, encoding computer-executable instructions for executing on a computer system a computer process, the computer process including communicating a plurality of process calls from a client object at a client process to a remote operation object, the plurality of process calls directed to a provider process across a process boundary, accumulating the plurality of process calls from the client object into a stand-in object, wherein the stand-in object mirrors the client object, generating a remote operations graph based on one or more conditional operations of the stand-in object, wherein the remote operations graph including a plurality of remote operations graph nodes encoding logic of the one or more conditional operations, and communicating the remote operations graph in a single cross-process call across the process boundary to the provider process.

An alternative implementation further includes serializing the remote operations graph into a flat type buffer. In another implementation each graph node includes an integer representing its neighboring node. In yet another implementation, serializing the remote operations further comprising generating a flat vector of all nodes. Alternatively, the remote operations graph nodes including one or more of an instruction node, a fork node, a bridge node, and a subgraph node. Yet alternatively, each instruction node contains instruction representation and has a single neighboring node. In one implementation, each fork node contains a conditional representation and has at least two neighboring nodes. Alternatively, each subgraph node contains a sub remote operations graph such that entering a subgraph node results in entering a root node of the sub remote operations graph. Yet alternatively, the computer process further includes deserializing the remote operations graph at the provider process before executing one or more instructions of the remote operations graph.

In a computing environment, a method disclosed herein is performed at least in part on at least one processor, the method includes communicating a plurality of process calls from a client object at a client process to a remote operation object, the plurality of process calls directed to a provider process across a process boundary, accumulating the plurality of process calls from the client object into a stand-in object, wherein the stand-in object mirrors the client object, generating a remote operations graph based on one or more conditional operations of the stand-in object, wherein the remote operations graph including a plurality of remote operations graph nodes encoding logic of the one or more conditional operations, and communicating the remote operations graph in a single cross-process call across the process boundary to the provider process.

In one implementation, the method further includes serializing the remote operations graph into a flat type buffer. In one implementation, each graph node includes an integer representing its neighboring node. In one implementation serializing the remote operations further comprising generating a flat vector of all nodes. In another implementation, the remote operations graph nodes including one or more of an instruction node, a fork node, a bridge node, and a subgraph node. In yet another implementation, each instruction node contains instruction representation and has a single neighboring node. In another implementation, each fork node contains a conditional representation and has at least two neighboring nodes. Alternatively, each subgraph node contains a sub remote operations graph such that entering a subgraph node results in entering a root node of the sub remote operations graph.

A system includes memory, processor, and a remote operations application programming interface (API) system stored in the memory and executable by the one or more processor units, the emote operations API) system encoding computer-executable instructions on the memory for executing on the one or more processor units a computer process, the computer process including communicating a plurality of process calls from a client object at a client process to a remote operation object, the plurality of process calls directed to a provider process across a process boundary, accumulating the plurality of process calls from the client object into a stand-in object, wherein the stand-in object mirrors the client object, generating a remote operations graph based on one or more conditional operations of the stand-in object, wherein the remote operations graph including a plurality of remote operations graph nodes encoding logic of the one or more conditional operations, and communicating the remote operations graph in a single cross-process call across the process boundary to the provider process. In one implementation the computer process further includes serializing the remote operations graph into a flat type buffer. In another implementation, wherein each graph node includes an integer representing its neighboring node.

The above specification, examples, and data provide a complete description of the structure and use of exemplary embodiments of the invention. Since many implementations of the invention can be made without departing from the spirit and scope of the invention, the invention resides in the claims hereinafter appended. Furthermore, structural features of the different embodiments may be combined in yet another implementation without departing from the recited claims.

What is claimed is:

1. A physical article of manufacture including one or more tangible computer-readable storage media, encoding computer-executable instructions for executing on a computer system a computer process, the computer process comprising:
communicating a plurality of process calls from a client object at a client process to a remote operation object, the plurality of process calls directed to a provider process across a process boundary;
accumulating the plurality of process calls from the client object into a stand-in object, wherein the stand-in object mirrors the client object;
generating a remote operations graph based on one or more conditional operations of the stand-in object, wherein the remote operations graph including a plurality of remote operations graph nodes encoding logic of the one or more conditional operations; and
communicating the remote operations graph in a single cross-process call across the process boundary to the provider process.

2. The physical article of manufacture of claim 1, further comprising serializing the remote operations graph into a flat type buffer.

3. The physical article of manufacture of claim 1, wherein each graph node includes an integer representing its neighboring node.

4. The physical article of manufacture of claim 2, wherein serializing the remote operations graph further comprising generating a flat vector of all nodes.

5. The physical article of manufacture of claim 1, wherein the remote operations graph nodes including one or more of an instruction node, a fork node, a bridge node, and a subgraph node.

6. The physical article of manufacture of claim 5, wherein each instruction node contains instruction representation and has a single neighboring node.

7. The physical article of manufacture of claim 5, wherein each fork node contains a conditional representation and has at least two neighboring nodes.

8. The physical article of manufacture of claim 5, wherein each subgraph node contains a sub remote operations graph such that entering a subgraph node results in entering a root node of the sub remote operations graph.

9. The physical article of manufacture of claim 1, further comprising deserializing the remote operations graph at the provider process before executing one or more instructions of the remote operations graph.

10. In a computing environment, a method performed at least in part on at least one processor, the method comprising:
communicating a plurality of process calls from a client object at a client process to a remote operation object, the plurality of process calls directed to a provider process across a process boundary;

accumulating the plurality of process calls from the client object into a stand-in object, wherein the stand-in object mirrors the client object;

generating a remote operations graph based on one or more conditional operations of the stand-in object, wherein the remote operations graph including a plurality of remote operations graph nodes encoding logic of the one or more conditional operations; and communicating the remote operations graph in a single cross-process call across the process boundary to the provider process.

11. The method of claim 10, further comprising serializing the remote operations graph into a flat type buffer.

12. The method of claim 11, wherein each graph node includes an integer representing its neighboring node.

13. The method of claim 11, wherein serializing the remote operations graph further comprising generating a flat vector of all nodes.

14. The method of claim 10, wherein the remote operations graph nodes including one or more of an instruction node, a fork node, a bridge node, and a subgraph node.

15. The method of claim 14, wherein each instruction node contains instruction representation and has a single neighboring node.

16. The method of claim 14, wherein each fork node contains a conditional representation and has at least two neighboring nodes.

17. The method of claim 14, wherein each subgraph node contains a sub remote operations graph such that entering a subgraph node results in entering a root node of the sub remote operations graph.

18. In a computing environment, a system comprising:
memory;
one or more processor units;
a remote operations application programming interface (API) system stored in the memory and executable by the one or more processor units, the remote operations (API) system encoding computer-executable instructions on the memory for executing on the one or more processor units a computer process, the computer process comprising:

communicating a plurality of process calls from a client object at a client process to a remote operation object, the plurality of process calls directed to a provider process across a process boundary;

accumulating the plurality of process calls from the client object into a stand-in object, wherein the stand-in object mirrors the client object;

generating a remote operations graph based on one or more conditional operations of the stand-in object, wherein the remote operations graph including a plurality of remote operations graph nodes encoding logic of the one or more conditional operations; and communicating the remote operations graph in a single cross-process call across the process boundary to the provider process.

19. The system of claim 18, wherein the computer process further comprising serializing the remote operations graph into a flat type buffer.

20. The system of claim 18, wherein each graph node includes an integer representing its neighboring node.

* * * * *